US006953226B2

(12) United States Patent
Bruce et al.

(10) Patent No.: US 6,953,226 B2
(45) Date of Patent: Oct. 11, 2005

(54) WHEEL ORNAMENTATION ASSEMBLY

(75) Inventors: Jeff Bruce, Fowlerville, MI (US); Eric Jensen, Oxford, MI (US); Roger Renaud, Milford, MI (US)

(73) Assignee: McKechnie Vehicle Components (USA), Troy, MI (US)

( * ) Notice: Subject to any disclaimer, the term of this patent is extended or adjusted under 35 U.S.C. 154(b) by 78 days.

(21) Appl. No.: 10/679,648

(22) Filed: Oct. 6, 2003

(65) Prior Publication Data

US 2005/0073192 A1 Apr. 7, 2005

(51) Int. Cl.[7] .......................... B60B 7/14; B60B 27/00
(52) U.S. Cl. .......................... 301/37.373; 301/37.372; 301/108.4
(58) Field of Search .................. 301/37.01, 37.102, 301/37.31, 37.372, 37.373, 37.42, 108.1, 301/108.3, 37.101, 108.4, 37.32; 280/156, 280/160

(56) References Cited

U.S. PATENT DOCUMENTS

| | | | |
|---|---|---|---|
| 3,135,558 A * | 6/1964 | Johnston, Jr. et al. | ... 301/37.42 |
| 4,382,635 A * | 5/1983 | Brown et al. | ............ 301/37.35 |
| 4,458,952 A * | 7/1984 | Foster et al. | ............ 301/37.35 |
| 4,707,035 A | 11/1987 | Kondo et al. | |
| 5,163,739 A | 11/1992 | Stanlake | |
| 5,249,845 A * | 10/1993 | Dubost | .................. 301/37.373 |
| 5,595,422 A * | 1/1997 | Ladouceur | ............... 301/37.21 |
| 5,918,946 A | 7/1999 | DiMarco | |
| 6,022,081 A * | 2/2000 | Hauler et al. | .......... 301/37.373 |
| 6,238,007 B1 * | 5/2001 | Wieczorek et al. | ...... 301/37.31 |
| 6,325,461 B1 * | 12/2001 | Hauler | .................. 301/37.372 |
| 6,682,151 B1 * | 1/2004 | Van Houten et al. | ... 301/37.373 |

FOREIGN PATENT DOCUMENTS

JP            362184901 A  *  8/1987  .............. 301/108.4

* cited by examiner

Primary Examiner—Russell D. Stormer
Assistant Examiner—Jason H. Bellinger
(74) Attorney, Agent, or Firm—Butzel Long

(57) ABSTRACT

A wheel ornamentation assembly is provided for attachment to a wheel secured to a wheel hub with a plurality of lug nuts. The wheel ornamentation assembly includes a wheel ornamentation body having an outboard surface and an inboard surface. The wheel ornamentation assembly also includes a first annular wall extending axially from the inboard surface. The wheel ornamentation assembly includes a plurality of first retention legs extending axially from the first annular wall. The wheel ornamentation assembly also includes a second annular wall extending axially from the inboard surface. The second annular wall is spaced radially from the first annular wall. The wheel ornamentation assembly further includes a plurality of second retention legs extending axially from the second annular wall. The first annular wall and the second annular wall of the wheel ornamentation assembly cooperate to define a plurality of lug cavities adapted to receive a lug nut. The first retention legs of the first annular wall and the second retention legs of the second annular wall are spaced circumferentially about the lug nut cavities.

20 Claims, 3 Drawing Sheets

WHEEL ORNAMENTATION ASSEMBLY

BACKGROUND OF THE INVENTION

1. Field of the Invention

The present invention relates generally to wheels for vehicles and, more specifically, to a wheel ornamentation assembly for wheels of a vehicle.

2. Description of the Related Art

It is known to provide wheel ornamentation such as wheel caps and wheel covers for wheels of a vehicle such as an automotive vehicle to enhance appearance of the wheels. Wheel ornamentation is used because it is less expensive to manufacture, finish, and mount the wheel ornamentation to the wheel than to manufacture the wheel with the same quality finish of the wheel ornamentation. A chrome surface on the wheel ornamentation is an inexpensive alternative to a chrome plated or polished wheel. In addition, wheel ornamentation provides various types of appearances and styling variations, all of which may be combined with a single wheel design.

It is also known to manufacture the wheel ornamentation of a plastic material and attach the plastic wheel ornamentation to lug nuts of the wheel. An example of such a wheel ornamentation is disclosed in U.S. Pat. No. 6,022,081 to Hauler et al. In this patent, an ornamental wheel cover is provided with a number of elongated tubular extensions axially projecting from the cover that are each partially slotted to provide cantilevered fingers. Each finger has an undercut groove that has a shoulder, which positively positions the cover to an upper shoulder of the lug nuts of the wheel. Below the undercut groove is a bulbous portion that contacts the lug nut below the flange and engages the underside of the flange, thereby retaining the cover on the lug nut.

While it may be preferable for a wheel ornamentation to operatively engage the lug nuts of a wheel, concern arises over reliable engagement of the lug nuts by the wheel ornamentation because of the different thermal properties between the wheel ornamentation and the lug nuts. Specifically, lug nuts are heated by the wheel as the wheel rotates, thereby heating the extensions of the plastic wheel ornamentation. As a result, the heated plastic may relax, causing the retention force of the extensions to decrease. The decreased retention force of the extensions may result in the wheel ornamentation disengaging the wheel.

To counter the effects of heat on the retention areas of a plastic wheel ornamentation, it is known to employ a wire retainer to provide mechanical support. However, there remain applications where employing a wire retainer is less desirable, as it increases cost as well as the steps of assembly relating to the wheel ornamentation. As a result, a plastic wheel ornamentation that effectively disperses heat radiated by the lug nuts and/or includes increased structural support for the retention areas to absorb the radiated heat without compromising the retentive ability of the wheel ornamentation is preferred.

Accordingly, there is a need in the art for a plastic wheel ornamentation for operatively engaging the lug nuts of a wheel having increased structural support at the retaining areas. Further, there is a need in the art for a plastic wheel ornamentation with improved heat dispersion retaining areas to provide reliable retention to the lug nuts throughout the acceptable product life of the wheel ornamentation.

SUMMARY OF THE INVENTION

Accordingly, the present invention is a wheel ornamentation assembly for attachment to a wheel secured to a wheel hub with a plurality of lug nuts. The wheel ornamentation assembly includes a wheel ornamentation body having an outboard surface and an inboard surface. The wheel ornamentation assembly also includes a first annular wall extending axially from the inboard surface. The wheel ornamentation assembly includes a plurality of first retention legs extending axially from the first annular wall. The wheel ornamentation assembly also includes a second annular wall extending axially from the inboard surface. The second annular wall is spaced radially from the first annular wall. The wheel ornamentation assembly further includes a plurality of second retention legs extending axially from the second annular wall. The first annular wall and the second annular wall of the wheel ornamentation assembly cooperate to define a plurality of lug cavities adapted to receive a lug nut. The first retention legs of the first annular wall and the second retention legs of the second annular wall are spaced circumferentially about the lug nut cavities.

one advantage of the present invention is that a wheel ornamentation assembly is provided for a wheel of a vehicle. Another advantage of the present invention is that the wheel ornamentation assembly has support walls that provide structural support for plastic wheel ornamentation, without which the plastic wheel ornamentation may relax under stress and/or heat. Yet another advantage of the present invention is that the wheel ornamentation assembly includes a channel that directs heat away from the retaining area. Still another advantage of the present invention is that the wheel ornamentation assembly includes integrated retaining areas to reduce steps in the manufacturing process required for multi-component wheel ornamentation assemblies as well as to reduce the steps in the assembly and installation process. A further advantage of the present invention is that the wheel ornamentation assembly has stand-off features, which contact the top of the lug nuts, providing a positive-stop during installation. Yet a further advantage of the present invention is that the wheel ornamentation assembly has a shoulder in spaced relation to the top of a lug nut flange to provide an over-install limiter during installation. Still a further advantage of the present invention is that the wheel ornamentation assembly has plastic legs that grip on the outside of the lug nut.

other features and advantages of the present invention will be readily appreciated, as the same becomes better understood, after reading the subsequent description taken in conjunction with the accompanying drawings.

DESCRIPTION OF THE PREFERRED EMBODIMENT(S)

Figure 1:
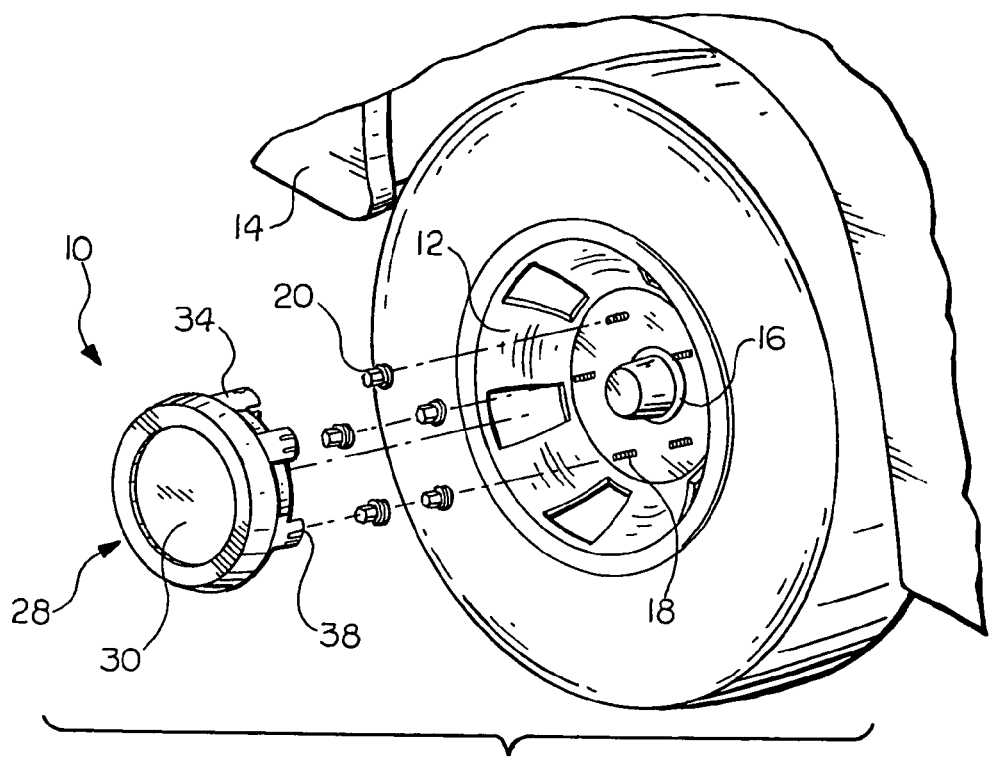
FIG. 1 is an exploded view of a wheel ornamentation assembly, according to the present invention, illustrated in operational relationship with a wheel of a vehicle.
Figure 2:
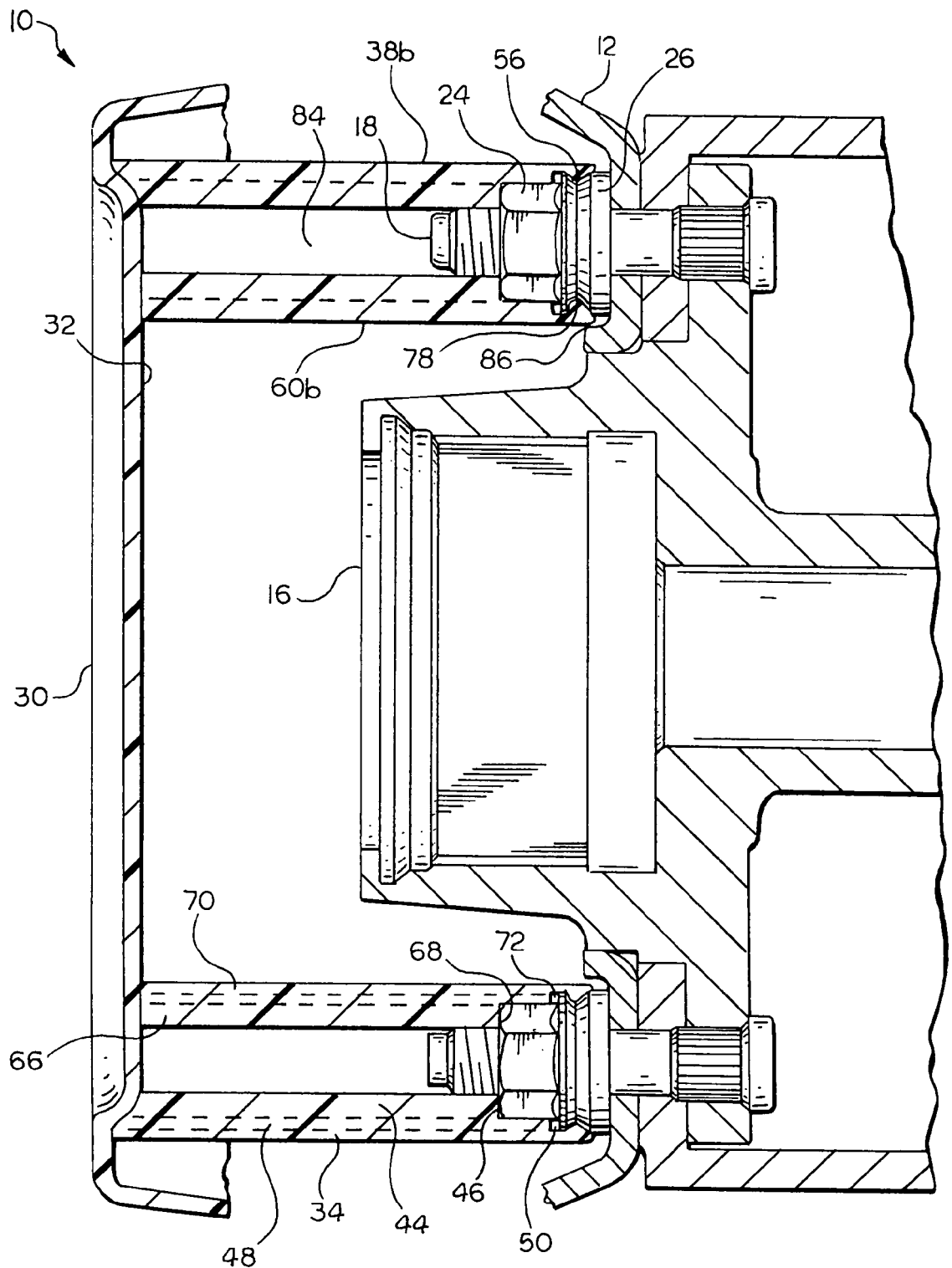
FIG. 2 is a cross-sectional view of the wheel ornamentation assembly and wheel of FIG. 1.

Referring to the drawings and in particular FIGS. 1 and 2, one embodiment of a wheel ornamentation assembly 10, according to the present invention, is shown for a wheel 12 of a vehicle 14 such as an automotive vehicle. The vehicle 14 has at least one wheel hub 16 with a plurality of lug studs 18 extending axially therefrom. The wheel 12 is secured to the wheel hub 16 with a plurality of lug nuts 20 which threadingly engage the lug studs 18. As known in the art, lug nuts 20 include a top portion 22 typically having an aperture (not shown) through which a lug stud 18 may pass when the lug nut 20 is secured to the lug stud 18. The lug nuts 20 also include a contact surface 24 for contact with a lug wrench (not shown, but generally known in the art) when the lug nut 20 is secured or removed from a lug stud 18. The lug nuts 20 further include a flange 26 along the outer circumference depending from the contact surface 24. The wheel ornamentation assembly 10 is attached to the lug nuts 20 in a manner to cover the lug nuts 20 as will be described in greater detail below. It should be appreciated that, except for the wheel ornamentation assembly 10, the wheel 12 and vehicle 14 are conventional and known in the art.

The wheel ornamentation assembly 10 includes a wheel ornamentation body, generally indicated at 28, for attachment to the lug nuts 20. In the embodiment shown, the wheel ornamentation assembly 10 is a monolithic structure being integral, unitary, and one-piece and made of plastic material. It should be appreciated that the wheel ornamentation assembly 10 may be made from any number of manufacturing techniques known in the art suitable for the desired material, such as injection or cast molding.

Figure 3:
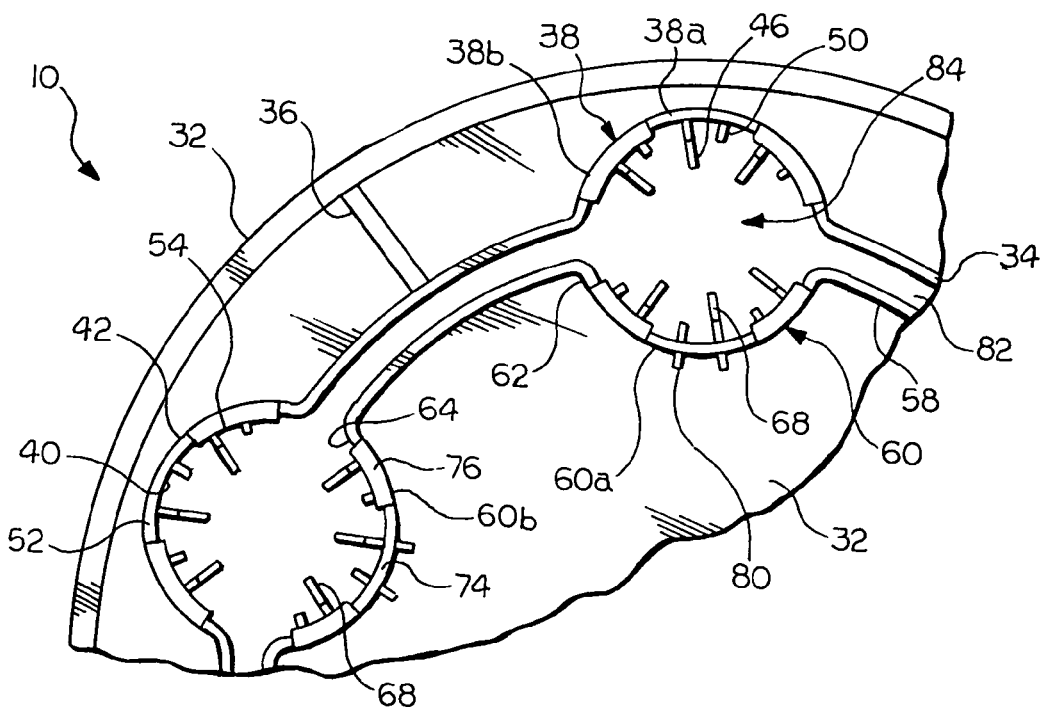
FIG. 3 is a partial elevational view of the wheel ornamentation assembly of FIG. 1.
Figure 4:
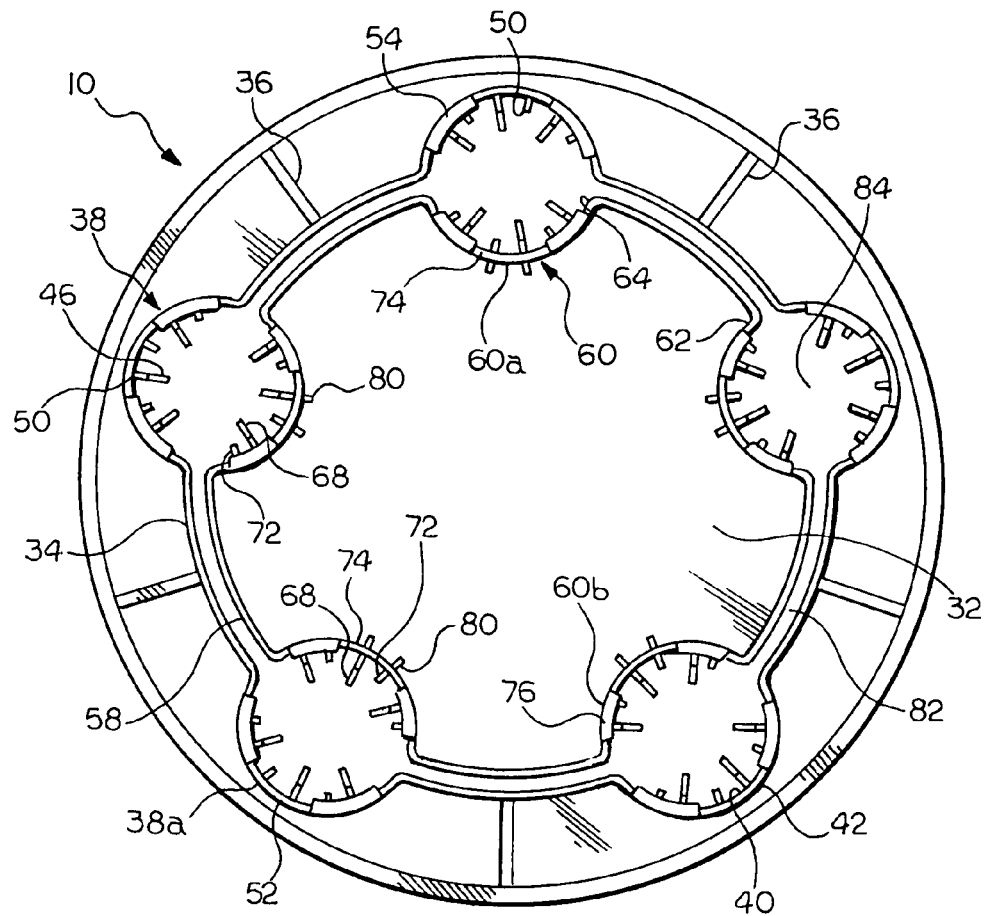
FIG. 4 is an elevational view of the wheel ornamentation assembly of FIG. 1.
Figure 5:
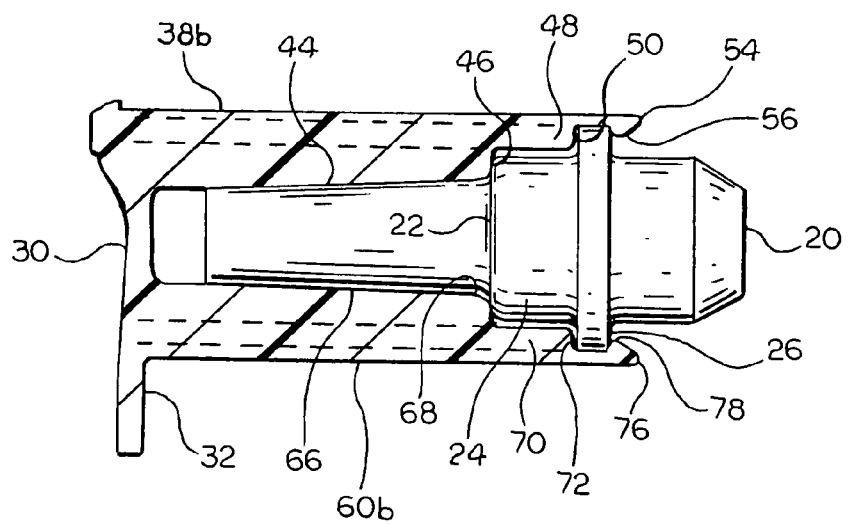
FIG. 5 is a partial fragmentary view of a portion of the wheel ornamentation assembly of FIG. 1.

Referring to FIGS. 2 through 4, the wheel ornamentation body 28 has an outboard surface 30 and an inboard surface 32. The wheel ornamentation body 28 is generally cylindrical in shape and may include contours and/or decorative features relative to the application of same to a particular vehicle wheel 12. It should be appreciated that the outboard surface 30 typically matches the appearance of the wheel 12 or a wheel cover (not shown). It should also be appreciated that the wheel ornamentation assembly 10 could be some other wheel ornamentation such as a wheel cover (not shown).

The wheel ornamentation assembly 10 also includes a first annular wall 34 extending axially from the inboard surface 32. The first annular wall 34 is supported with respect to the outer circumference of the wheel ornamentation body 28 by a plurality of reinforcing partitions 36 extending axially between the outer circumference of the first annular wall 34 and the outer circumference of the inboard surface 32.

Referring to FIGS. 2 through 5, the first annular wall 34 includes a plurality of retention legs, generally indicated at 38, extending axially therefrom. As illustrated in FIG. 2, the retention legs 38 of the first annular wall 34 have a cross-section that extends through an arcuate path and includes an inner surface 40 and an outer surface 42 relative to a central axis. The inner surface 40 of the retention legs 38 includes a plurality of standoffs 44 that extend axially from the inner surface 40. The standoffs 44 have a terminal end 46 adapted to engage the top portion 22 of a lug nut 20 to provide a positive stop during installation of the wheel ornamentation assembly 10 to a wheel 12. In the embodiment illustrated in FIGS. 1 through 5, two standoffs 44 are provided within each retention leg 38. Alternatively, one or three standoffs 44 may be employed on each retention leg 38. It should be appreciated that any number of standoffs 44 may be employed on the inner surface 40 of each retention leg 38.

Referring to FIGS. 2 through 5 the wheel ornamentation assembly 10 includes a plurality of support ribs 48 extending axially from the inner surface 40 of the retention legs 38 of the first annular wall 34. Each of the support ribs 48 has a terminal end 50 in spaced relation to a lug nut flange 26. The terminal ends 50 of the support ribs 48 provide an over-install limiter that engage the lug nuts 20 when the wheel ornamentation assembly 10 attempts to engage the lug nuts 20 beyond a predetermined area, thereby reducing the likelihood of improperly installing the wheel ornamentation assembly 10. In the embodiment illustrated in FIGS. 1 through 5, two support ribs 48 are provided within each retention leg 38. Alternatively, one or three support ribs 48 may be employed on each retention leg 38. It should be appreciated that any number of support ribs 48 may be employed on the inner surface 40 of each retention leg 38.

Referring to FIGS. 2 through 5, the retention legs 38 include retention legs 38a having an apical end 52 adapted to operatively engage the contact surface 24 of a lug nut 20, as well as retention legs 38b having an apical end 54 including a flange 56 adapted to operatively engage the rear portion of a lug nut flange 26 to attach and retain the wheel ornamentation assembly 10 to the lug nuts 20. It should be appreciated that the retention legs 38b flex to be disposed over the lug nuts 20 during installation of the wheel ornamentation assembly 10 such that the flange 56 is received in the rear portion of the lug nut flange 26.

The wheel ornamentation assembly 10 further includes a second annular wall 58 extending axially from the inboard surface 32. The second annular wall 58 includes a plurality of retention legs, generally indicated at 60, extending axially therefrom that have a cross-section that extends through an arcuate path. As illustrated in FIG. 2, the retention legs 60 of the second annular wall 58 include an inner surface 62 and an outer surface 64 relative to a central axis. It should be appreciated that the retention legs 60 of the second annular wall 58 are substantially similar to the retention legs 38 of the first annular wall 34, wherein the inner surface 40 of the retaining legs 38 of the first annular wall 34 are reflected in the outer surface 64 of the retaining legs 60 of the second annular wall 58.

The retention legs 60 of the second annular wall 58 include a plurality of standoffs 66 extending axially from the outer surface 64 and having a terminal end 68 adapted to engage the top portion 22 of a lug nut 20 and a plurality of support ribs 70 extending axially from the outer surface 64 and having a terminal end 72 in spaced relation to top of a lug nut flange 26. The retention legs 60 of the second annular wall 58 further include retention legs 60a having an apical end 74 adapted to operatively engage the contact surface 24 of a lug nut 20 similar to the retention legs 38a as well as retention legs 60b having an apical end 76 including a flange 78 adapted to operatively engage the rear portion of a lug nut flange 26 similar to the retention legs 38b.

Referring to FIGS. 3 and 4, the inner surface 62 of the retaining legs 60 of the second annular wall 58 includes at least one supportive spine 80 extending axially therefrom. In the embodiment illustrated in FIGS. 1 through 5, two supportive spines 80 are provided along the inner surface of each retention leg 60. Alternatively, one or three supportive spines 80 may be employed on each retention leg 60. It should be appreciated that any number of supportive spines 80 may be employed on the inner surface 62 of each retention leg 60. It should also be appreciated that the supportive spines 80 may also include cross-members to provide additional support.

As illustrated in FIG. 4, the second annular wall 58 is spaced radially from the first annular wall 34 in a manner such that the first annular wall 34 surrounds the second annular wall 58. Together, the first annular wall 34 and the second annular wall 58 cooperate to define a channel 82 therebetween. The channel 82 may provide an avenue through which heat radiating from the lug nuts 20 and lug studs 18 during operation may be dispersed to reduce the amount of heat absorbed by the retaining legs 38, 60. In the embodiment illustrated in FIGS. 1 through 5, the channel 82 extends to the inboard surface 32 of the wheel ornamentation body 28. It should be appreciated that the channel 82 may include cross-supports for additional strength.

The first annular wall 34 and the second annular wall 58 cooperate to define a plurality of lug cavities 84 each is adapted to receive a lug nut 20. The lug cavities 84 are generally cylindrical in shape and correspond to the lug studs 18 of the wheel hub 16 to receive the lug nuts 20. As illustrated in FIGS. 1 through 5, the wheel ornamentation assembly 10 includes five lug cavities 84. By way of example, the present invention may employ a five-lug cavity 84 wheel ornamentation assembly 10 for application to a wheel hub 16 having four or five lug studs 18 where the lug stud patterns are substantially similar. Additionally by way of example, the present invention may employ an eight-lug cavity 84 wheel ornamentation assembly 10 corresponding to a specific lug stud pattern or patterns. It should be appreciated that the wheel ornamentation assembly 10 may employ any number of lug cavities 84 for application to any pattern of lug studs 18.

The retention legs 38 of the first annular wall 34 are circumferentially aligned around the outer circumference of the lug cavities 84 spanning less than one hundred eighty degrees of the outer circumference. Additionally, the retention legs 60 of the second annular wall 58 are circumferentially aligned around the outer circumference of the lug cavities 84 spanning less than one hundred eighty degrees of the outer circumference. In combination, the retention legs 38, 60 of the first annular wall 34 and the second annular wall 58 are circumferentially disposed about the outer circumference of the lug nut cavities 84 spanning less than three hundred sixty degrees of the outer circumference.

As illustrated in FIGS. 3 and 4, a predetermined number of each of the retention legs 38a, 38b, 60a, 60b of the first annular wall 34 and the second annular wall 58 are disposed along the outer circumference of the lug cavities 84. In the embodiment illustrated in FIGS. 1 through 5, two of the retention legs 38b, 60b have a flange 56, 78 and one of the retention legs 38a, 60a of the first and second annular walls 34, 58 adapted to engage the contact surface 24 of a lug nut 20; all of which are disposed along the outer circumference of the lug cavities 84. It should be appreciated that any predetermined number of retention legs 38, 60 of either variant 38a, 38b, 60a, 60b may be employed about the outer circumference of the lug cavities 84.

To assemble the wheel ornamentation assembly 10, the wheel ornamentation assembly 10 is moved toward the lug nuts 20 such that the retention legs 38b, 60b are flexed to receive the lug nuts 20 and the flanges 56, 78 are disposed in the rear portion of the lug nut flange 26. Additionally, the apical end 52, 74 of the retention legs 38a, 60b operatively engage the contact surface 24 of the lug nuts 20. The terminal ends 46, 72 of the standoffs 44, 66 engage the top portion 22 of the lug nuts 20. The support ribs 48, 70 are disposed in spaced relation to the top portion of the lug nut flanges 26 to prevent over-travel of the wheel ornamentation assembly 10.

The present invention has been described in an illustrative manner. It is to be understood that the terminology, which has been used, is intended to be in the nature of words of description rather than of limitation.

Many modifications and variations of the present invention are possible in light of the above teachings. Therefore, within the scope of the appended claims, the present invention may be practiced other than as specifically described.

What is claimed is:

1. A wheel ornamentation assembly for attachment to a wheel secured to a wheel hub with a plurality of lug nuts each lug nut having a lug nut flange along the outer circumference, said wheel ornamentation assembly comprising:

a wheel ornamentation body having an outboard surface and an inboard surface;

a first annular wall extending axially from said inboard surface including a plurality of first retention legs extending axially therefrom; and a second annular wall extending axially from said inboard surface including a plurality of second retention legs extending axially therefrom, said second annular wall spaced radially from said first annular wall and cooperating to define a plurality of lug cavities each having a central axis and being adapted to receive a lug nut, said first retention legs of said first annular wall and said second retention legs of said second annular wall being spaced circumferentially about said lug nut cavities.

2. A wheel ornamentation assembly as set forth in claim 1 wherein said first retention legs of said first annular wall are disposed along the outer circumference of said lug cavities.

3. A wheel ornamentation assembly as set forth in claim 2 wherein said first retention legs span less than one hundred eighty degrees of the outercircumference of said lug cavities.

4. A wheel ornamentation assembly as set forth in claim 1 wherein said second retention legs of said second annular wall are disposed along the outer circumference of said lug cavities.

5. A wheel ornamentation assembly as set forth in claim 4 wherein said second retention legs span less than one hundred eighty degrees of the outer circumference of said lug cavities.

6. A wheel ornamentation assembly as set forth in claim 1 wherein said first retention legs of said first annular wall and said second retention legs of said second annular wall are circumferentially disposed about the outer circumference of said lug nut cavities spanning less than three hundred sixty degrees of said outer circumference.

7. A wheel ornamentation assembly as set forth in claim 1 wherein said first retention legs of said first annular wall and said second retention legs of said second annular wall include retention legs having an apical end adapted to operatively engage a side portion of the lug nut, and retention legs having an apical end including a flange adapted to operatively engage a rear portion of the lug nut flange.

8. A wheel ornamentation assembly as set forth in claim 1 wherein said first retention legs of said first annular wall include an inner surface and an outer surface relative to the central axis of the lug cavity defined thereby, said inner surface having a plurality of standoffs extending axially therefrom, said standoffs having a terminal end adapted to engage the top portion of the lug nuts to provide a positive stop.

9. A wheel ornamentation assembly as set forth in claim 1 wherein said second retention legs of said second annular wall include an outer surface relative to the central axis of the lug cavity defined thereby having a plurality of standoffs extending axially therefrom, said standoffs having a terminal end adapted to engage the top portion of a lug nut to provide a positive stop, said second annular wall further including an inner surface relative to the central axis of the lug cavity defined thereby having at least one supportive spine extending radially therefrom.

10. A wheel ornamentation assembly as set forth in claim 1 including a plurality of support ribs extending axially from said inner surface of said first retention legs of said first annular wall and said outer surface of said second retention legs of said second annular wall, said support ribs having a terminal end in spaced relation to the top portion of a lug nut flange.

11. A wheel ornamentation assembly as set forth in claim 1 including plurality of reinforcing partitions extending axially between the outer circumference of said first annular wall and the outer circumference of said inboard surface of said wheel ornamentation body.

12. A wheel ornamentation assembly as set forth in claim 1 wherein said first annular wall and said second annular wall cooperate to define a channel therebetween.

13. A wheel ornamentation assembly as set forth in claim 1 wherein said wheel ornamentation is made of a plastic material.

14. A wheel ornamentation assembly for attachment to a wheel secured to a wheel hub with a plurality of lug nuts each lug nut having a lug nut flange along the outer circumference, said wheel ornamentation assembly comprising:
   a wheel ornamentation body having an outboard surface and an inboard surface;
   a first annular wall extending axially from said inboard surface including a plurality of first retention legs extending axially therefrom, said first retention legs including retention legs having an apical end adapted to operatively engage the side portion of a lug nut, and retention legs having an apical end including a flange adapted to operatively engage the rear portion of a lug nut flange; and
   a second annular wall extending axially from said inboard surface spaced radially from said first annular wall and cooperating to define a plurality of lug cavities each having a central axis and being adapted to receive a lug nut, said second annular wall having a plurality of second retention legs extending axially therefrom including retention legs having an apical end adapted to operatively engage the side portion of a lug nut and retention legs having an apical end including a flange adapted to operatively engage the rear portion of a lug nut flange, wherein said first retention legs of said first annular wall and said second retention legs of said second annular wall are circumferentially aligned about the outer circumference of each of said lug nut cavities spanning less than three hundred and sixty degrees of said outer circumference.

15. A wheel ornamentation assembly as set forth in claim 14 wherein said first retention legs of said first annular wall include an inner surface and an outer surface relative to the central axis of the lug cavity defined thereby, said inner surface having a plurality of standoffs extending axially therefrom, said standoffs having a terminal end adapted to engage the top portion of the lug nuts to provide a positive stop.

16. A wheel ornamentation assembly as set forth in claim 14 wherein said second retention legs of said second annular wall include an outer surface relative to the central axis of the lug cavity defined thereby having a plurality of standoffs extending axially therefrom, said standoffs having a terminal end adapted to engage the top portion of a lug nut to provide a positive stop, said second annular wall further including and an inner surface relative to the central axis of the lug cavity defined thereby having at least one supportive spine extending radially therefrom.

17. A wheel ornamentation assembly as set forth in claim 14 including a plurality of support ribs extending axially from said inner surface of said retention legs of said first annular wall and said outer surface of said second annular wall, said support ribs having a terminal end in spaced relation to the top portion of a lug nut flange.

18. A wheel ornamentation assembly as set forth in claim 14 including plurality of reinforcing partitions extending axially between the outer circumference of said first annular wall and said inboard surface of said wheel ornamentation body.

19. A wheel ornamentation assembly as set forth in claim 14 wherein said first annular wall and said second annular wall cooperate to define a channel therebetween.

20. A wheel ornamentation assembly as set forth in claim 14 wherein said wheel ornamentation is made of a plastic material.

* * * * *